June 22, 1965 J. P. SLIFKA ETAL 3,190,107
EXTRUSION DIE
Filed Dec. 13, 1962 2 Sheets-Sheet 1
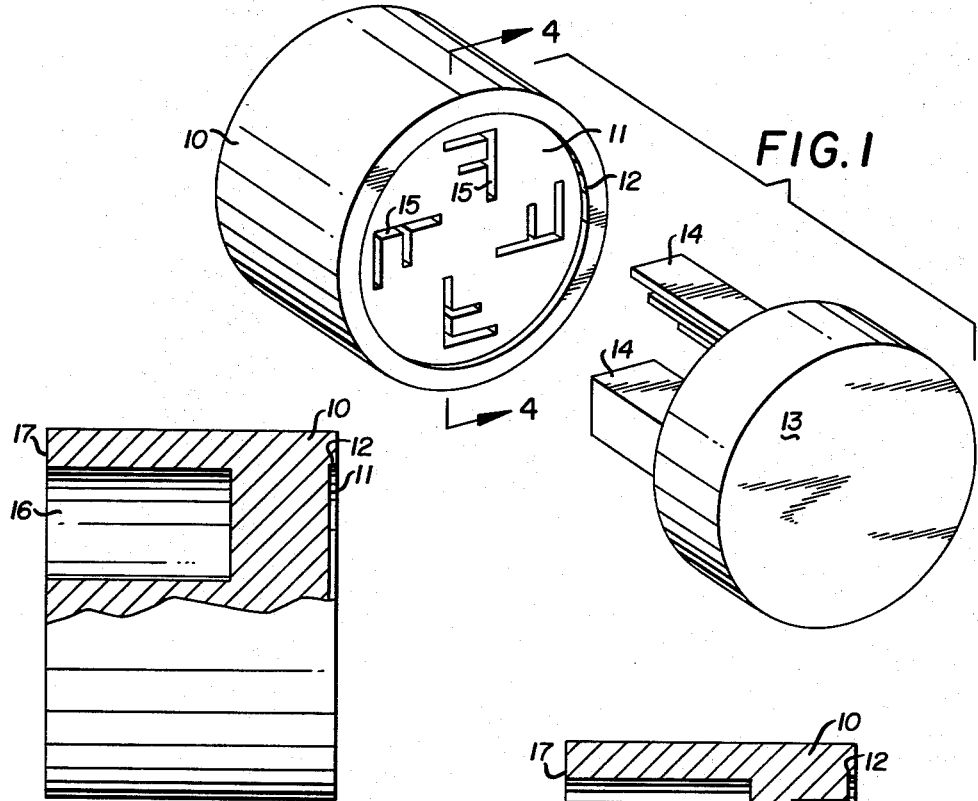
FIG.1
FIG.2
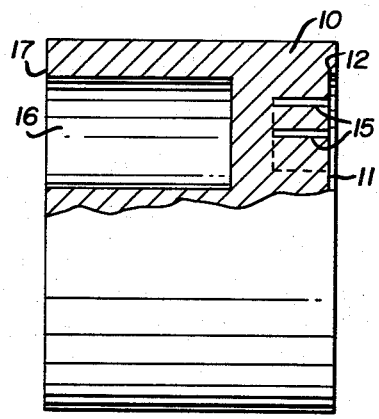
FIG.3
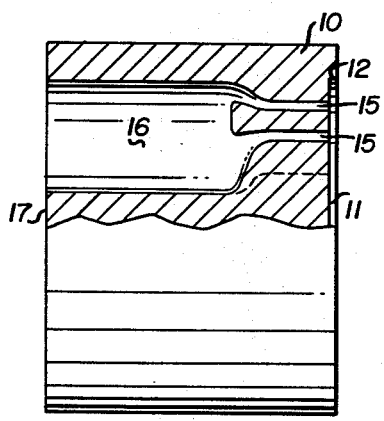
FIG.4
INVENTORS
JOSEPH P. SLIFKA &
PETER N. VONU
BY
W. B. Harpman
ATTORNEY June 22, 1965   J. P. SLIFKA ETAL   3,190,107
EXTRUSION DIE
Filed Dec. 13, 1962   2 Sheets-Sheet 2

INVENTORS
JOSEPH P. SLIFKA &
PETER N. VONU
BY W. B. Harpman
ATTORNEY

United States Patent Office 3,190,107
Patented June 22, 1965

3,190,107
EXTRUSION DIE
Joseph P. Slifka and Peter N. Vonu, Youngstown, Ohio, assignors to Extrusion Dies, Inc., Youngstown, Ohio, a corporation of Ohio
Filed Dec. 13, 1962, Ser. No. 244,425
4 Claims. (Cl. 72—468)

This invention relates to an extrusion die as used in extruding metals such as aluminum and wherein the die has one or more desirably shaped extrusion openings through which the metal is extruded under pressure. The invention relates primarily to a novel extrusion die formed of a single piece of steel.

The principal object of the invention is the provision of a unitary extrusion die having one or more extrusion openings therethrough.

A further object of the invention is the provision of a method of forming a unitary extrusion die.

A still further object of the invention is the provision of an extrusion die which incorporates one or more extrusion openings and suitable structural portions formed integrally in the die to support the portions thereof defining the extrusion openings.

A still further object of the invention is the provision of a method of forming a unitary extrusion die utilizing an electric spark discharge machine for forming the shaped extrusion openings and a method of removing the material of the die to form areas therein communicating with said shaped openings.

The extrusion die disclosed herein comprises an improvement in the art relating to such devices and particularly in the disclosure of a unitary extrusion die having one or more extrusion openings therein. It has heretofore been believed necessary to form multiple opening extrusion dies in two or more parts which required double the time and labor as compared with forming such a die as a unitary structure. The difficulty in forming an extrusion die as a unitary structure has been the necessity of having the actual suitably shaped extrusion openings formed in the face of the die and extending through the adjacent body thereof and communicating with adequately sized passageways through which the semi-fluid metal can flow. It has heretofore been common to form one portion of such a die to contain the extrusion openings and a second portion to include the metal feeding passageways. Such die parts could obviously be easily formed if the respective shaped openings were simply made to extend completely through the respective die parts and the shape permitted such. In utilizing such two-part dies, the problem of maintaining the two parts in metal-tight contact exists and the additional machining, shaping and matching of the parts is at least doubled as compared with forming the die of a single piece of metal as disclosed herein. The present invention produces a satisfactory and efficient extrusion die as a unitary structure incorporating the frontal portion including the actual extrusion openings and a rearwardly extending portion incorporating the metal feeding passageways and this improved die has the additional advantage of providing for the rapid distribution of heat from the area forming the walls about the extrusion openings as well as the ability to withstand increased pressures and maintain central webs of die shapes and resist warping as otherwise occurs in a multiple part die.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of an extrusion die and a shaped electrode used in forming the extrusion openings in the die.

FIGURE 2 is a vertical section through a portion of an extrusion die showing a metal feeding cavity formed therein.

FIGURE 3 is a cross section of an extrusion die similar to FIGURE 2 and showing a shaped extrusion opening formed therein as by the spark discharge electrode seen in FIGURE 1.

FIGURE 4 is a view of an extrusion die similar to FIGURES 2 and 3 showing the metal feeding cavity and shaped extrusion openings brought into communication by passageways resulting from a metal removing operation.

Figure 5:
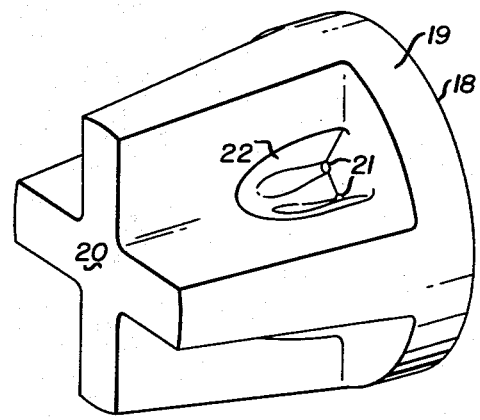
FIGURE 5 is a perspective view of a modified form of the extrusion die showing the rearmost side portions cutaway instead of forming metal feeding cavities therein.

By referring to the drawings and FIGURES 1 through 4 in particular, it will be seen that a preferred embodiment of the invention has been illustrated therein and wherein an extrusion die comprising a cylindrical body member 10 having a front surface 11 recessed as at 12 is shown in axial alignment with a shaped electrode of a spark discharge machine, the electrode body being indicated by the numeral 13 and the shaped electrodes extending outwardly therefrom being indicated by the numerals 14. Those skilled in the art will recognize that a shaped electrode of a spark discharge machine is capable of forming a shaped opening in a piece of metal such as the die body 10 and such openings are shown in the front or downstream end 11 of the die body 10 and indicated by the numerals 15. In forming the die shown in FIGURE 1, the die body 10 is first machined to its cylindrical shape as shown and one or more cavities 16 are formed inwardly of the rear or upstream end 17 thereof as illustrated in FIGURE 2 of the drawings. The cavity 16 may be formed by burning or milling as desired. The shaped electrode properly installed in a spark discharge machine (not shown) is then positioned so that the electrode 14 engages the front 11 of the die body 10 and progressively moved into the same as the metal is consumed by the spark discharge. The resulting shaped extrusion opening 15 is formed inwardly from the front 11 of the die body 10 as best seen in FIGURE 3 of the drawings. A further step is then performed which comprises milling away the metal in the die body 10 between the innermost ends of the shaped opening 15 and the innermost end of the cavity 16 as illustrated in FIGURE 4 of the drawings, it being observed that the milling or cutting away of the metal to form desirably shaped communication passageways from the cavity 16 to the openings 15 is so arranged that the intervening sections of metal forming the webs between the openings 15 are not cutaway. The die as seen in FIGURES 1 and 4 is complete and formed in an integral section of die steel with all the advantages inherent in such a structure. When placed in an extrusion press and subjected to heated metal as forced by a ram in such press, the metal flows initially into the cavity 16, through the cavity 16, through the communicating passageways into the shaped openings 15 and is extruded from the front 11 of the extrusion die.

Figure 7:
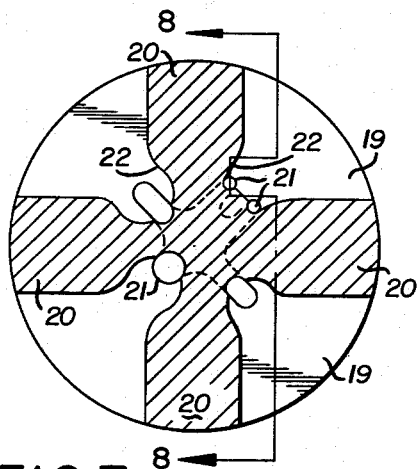
FIGURE 7 is a vertical section on line 7—7 of FIGURE 6.
Figure 6:
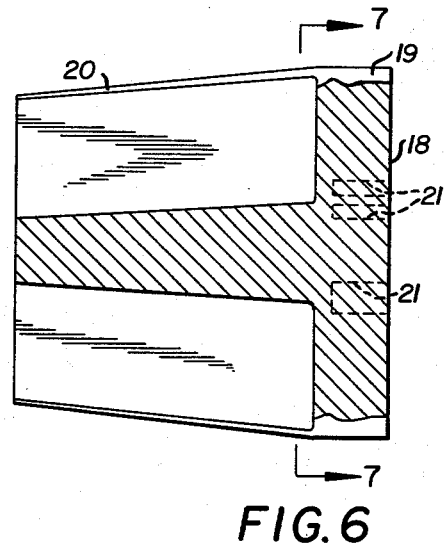
FIGURE 6 is a vertical section through the die shown in FIGURE 5.
Figure 8:
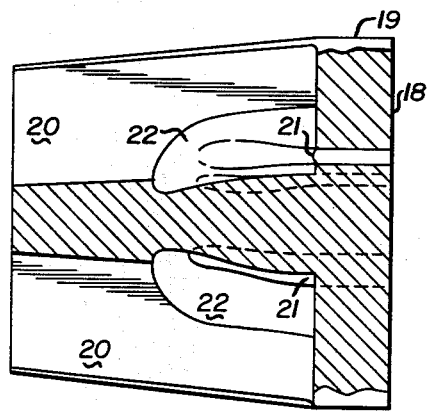
FIGURE 8 is a vertical section on line 8—8 of FIGURE 7.

Variations in the shape of the extrusion die formed as disclosed herein will occur to those skilled in the art and one such obvious and desirable variation is illustrated in FIGURES 5 through 9 of the drawings. By referring thereto and to FIGURE 5, it will be seen that an extrusion die is illustrated which includes a front 18, a circular body member 19 having a cross-shaped integral rearwardly extending portion 20. The extrusion die as illustrated in FIGURE 5 includes shaped extrusion openings 21 formed inwardly from the face 18 thereof and communicating with cutaway areas 22 in the cross-shaped rearwardly extending portion 20 of the die. The die shown in FIGURE 5 is formed by removing the metal from the rear sides of the die blank to form the cross-shaped rearward extension 20 as seen in the several FIGURES 5 through 8. A shaped electrode of a spark discharge machine (not shown) is then brought into engagement with the front 18 of the die and the shaped openings 21 formed inwardly of the front 18 by the action of the spark discharge machine as illustrated in FIGURE 6 of the drawings. The metal between the inner ends of the shaped openings 21 and the rearward extension 20 is then removed as by milling to form passageways as indicated at 22 in FIGURES 5, 7 and 8. In FIGURE 7, which is a section through the die shown in FIGURE 6 the passageways 22 are shown completed establishing communication between the shaped extrusion openings 21 and one or more of the four circumferentially spaced areas defining the cross-shaped extension 20. By referring now to FIGURE 8 of the drawings a vertical section taken on line 8—8 of FIGURE 7 may be seen and it will be obvious that when the circular portion of the die is positioned with the front 18 in extruding position in an extrusion press and heated metal under pressure is presented to the rearward side of the die comprising the cross shaped extension 20 the metal will flow through the circumferentially spaced cutaway areas about the cross shaped extension 20 and through the communicating passageways 22 and into the rearward ends of the shaped extrusion openings 21 and out of the front of the die as suitably shaped extrusions.

Those skilled in the art will observe that both forms of the extrusion die disclosed herein comprise integral blocks of die material such as steel with the front of the die having desirably shaped extrusion openings therein and the opposite or rearmost portion of the die cutaway to provide metal delivering cavities or areas and passageways communicating with the shaped extrusion openings. The unitary structure of the extrusion die disclosed herein possesses unique advantages over multi-part extrusion dies as heretofore believed necessary in multiple opening extrusion dies. The advantages include the greatly increased efficiency in heat transference and heat dissipation which greatly lengthens the life of the die and maintains the extrusion openings and separating webs in desired shape, the prevention of warping of the die by the integral structure thereof and its structural ability to withstand increased extrusion pressures while successfully shaping the metal being extruded therethrough, resulting in greatly increased die life.

It will thus be seen that an extrusion die meeting the several objects of the invention has been disclosed, and having thus described our invention, what we claim is:

1. An extrusion die comprising a single piece structure having a downstream delivery end portion with a cross-shaped rearwardly or upstream extending portion including a solid axial section, at least one shaped extrusion opening substantially perpendicular to said flat face portion and extending inwardly therefrom and at least one internal passageway in said cross-shaped rearwardly extending portion establishing communication between the inner end of said extrusion opening and the sides of said cross-shaped rearwardly extending portion.

2. An extrusion die comprising a solid cross sectionally round shaped single structure having a plurality of circumferentially spaced, longitudinally extending channel therein ending in spaced relation to one end thereof, said end having a transversely flat front, a plurality of spaced parallel extrusion openings in said flat front, a plurality of passageways interconnecting said extrusion openings with said longitudinally extending channels.

3. The extrusion die set forth in claim 2 and wherein said channels are V-shaped.

4. The extrusion die set forth in claim 2 and wherein said cross sectionally round shaped single structure is tapered.

References Cited by the Examiner

UNITED STATES PATENTS

| 572,546 | 12/96 | Johnson | 207—17.4 |
| 2,076,356 | 4/37 | Taylor | 76—107 |
| 2,239,425 | 4/41 | Jacobson | 76—107 |
| 2,723,028 | 11/55 | Carter | 207—17 |
| 2,894,625 | 7/59 | Harris et al. | 207—17 |
| 2,899,054 | 8/59 | Creutz | 207—17 |
| 2,973,092 | 2/61 | Graham | 207—17 |
| 3,063,560 | 11/62 | Edgecombe | 207—17 |
| 3,080,051 | 3/63 | Muller | 207—17.4 |

FOREIGN PATENTS

| 99,405 | 10/98 | Germany. |
| 6,612 | 1909 | Great Britain. |

CHARLES W. LANHAM, *Primary Examiner.*
MICHAEL V. BRINDISI, *Examiner.*